Patented Oct. 31, 1933

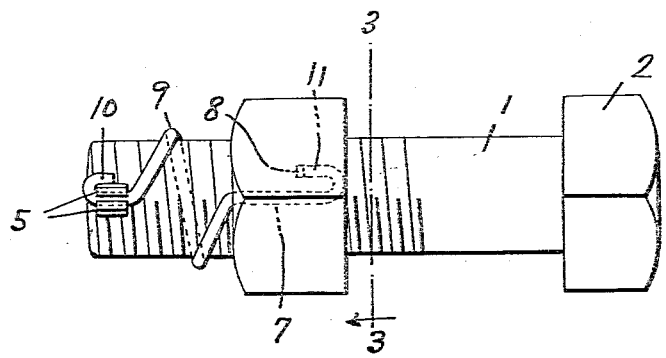

1,932,709

UNITED STATES PATENT OFFICE 1,932,709

NUT LOCK

Enos L. Rea, Oil City, Pa.

Application July 7, 1932. Serial No. 621,269

3 Claims. (Cl. 151—14)

The present invention relates to new and useful improvements in nut locks and has for some of its objects to provide, in a manner as hereinafter set forth, a device of this character which will be simple in construction, strong, durable, reliable in use and which may be manufactured at low cost.

Another important object of the invention is to provide a nut lock embodying a novel construction, combination and arrangement of parts through the medium of which the nut will be constantly tightened.

All of the foregoing and still further objects and advantages of the invention will become apparent from a study of the following specification, taken in connection with the accompanying drawing, wherein like characters of reference designate corresponding parts throughout the several views, and wherein:—

Figure 1 is a view in side elevation, showing a nut lock in accordance with the present invention.

Figure 2 is a view in end elevation thereof.

Figure 3 is a view in transverse section, taken substantially on the line 3—3 of Figure 1 and showing the nut lock before the spring is applied.

Referring now to the drawing in detail, it will be seen that the embodiment of the invention which has been illustrated comprises a threaded bolt 1 having a polygonal head 2 on one end. The other end portion of the bolt has extending transversely therethrough a tapered opening 3 for the reception of a tapered pin 4, the small end portion of which is split to provide bendable bifurcations 5. If desired, a number of the openings 3 may be provided and extend at angles with respect to each other. The opening 3 and pin 4 are polygonal as illustrated, but same may be round if desired. Further, the pin may be mounted in any position relative to the bolt other than at right angles thereto, as illustrated.

The reference numeral 6 designates a nut which is threaded on the bolt 1 before the pin 4 is inserted. Paralleling the threaded bore of the nut 6 is a passage 7 which extends from the outer to the inner side of said nut. At its inner end, the passage 7 curves and merges with a socket 8 which extends into the nut from the inner side thereof.

The reference numeral 9 designates a spring or resilient wire which is coiled or wrapped about the bolt 1 between the nut 6 and the pin 4, said spring or wire having one end portion clamped between the bifurcations 5 of the pin and clinched, as at 10. The other end portion of the spring or wire 9 extends through the passage 7 in the nut 6 and terminates in a hook 11 which is engaged in the socket 8.

When properly assembled, the spring or wire 9 is constantly under tension to tighten the nut 6. The spring or wire 9 may have as many coils as desired encircling the bolt 1. The hook 11 engaged in the socket 8 prevents the spring or wire 9 from becoming disengaged from the nut 6 and when said nut 6 is engaged with the work, displacement of the hook from its socket will be prevented, as will be obvious.

It is believed that the many advantages of a nut lock constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. An article of the character described comprising a bolt having a transverse opening therein, a nut threaded on the bolt having a passage therein from its outer to its inner side and further having a socket extending thereinto from its inner side and merging with the passage, a coil spring encircling the bolt and having one end portion extending through the passage and terminating in a hook engaged in the socket for connecting said spring to the nut, and a pin mounted in the opening in the bolt and secured to the other end of the spring for connecting said spring to the bolt.

2. A locked nut assembly comprising a threaded bolt, a nut threadedly mounted on the bolt, said nut having an opening extending therethrough from its outer to its inner side and further having a socket extending therein from its inner side, a coil spring encircling the bolt and having one end portion extending through the opening in the nut, a hook on said one end of the coil spring engaged in the socket, and means for connecting the other end of the coil spring to the bolt.

3. A locked nut assembly comprising a bolt having an opening therein, a nut threaded on the bolt, a tapered pin extending through the opening, bendable bifurcations on the small end of the pin, a coil spring encircling the bolt and having one end portion clamped between the bifurcations, and means connecting the other end of the coil spring to the nut.

ENOS L. REA.